UNITED STATES PATENT OFFICE.

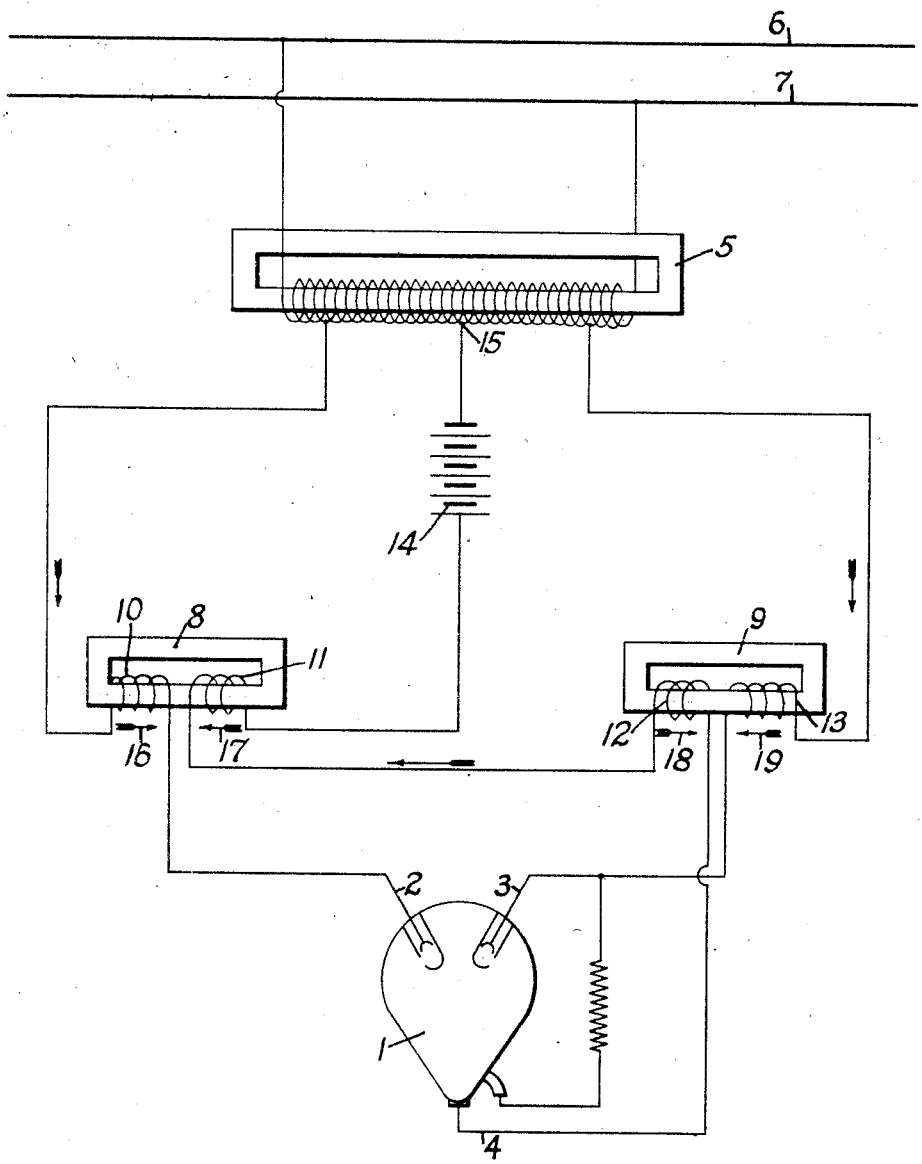

QUINCY A. BRACKETT, OF WILKINSBURG, PENNSYLVANIA, ASSIGNOR TO WESTINGHOUSE ELECTRIC AND MANUFACTURING COMPANY, A CORPORATION OF PENNSYLVANIA.

CURRENT-RECTIFIER SYSTEM.

1,036,789.  Specification of Letters Patent.  Patented Aug. 27, 1912.

Application filed November 8, 1911. Serial No. 659,190.

*To all whom it may concern:*

Be it known that I, QUINCY A. BRACKETT, a citizen of the United States, and a resident of Wilkinsburg, in the county of Allegheny and State of Pennsylvania, have invented a new and useful Improvement in Current-Rectifier Systems, of which the following is a specification.

My invention relates to current-rectifying devices and systems, and it has for its object to provide means whereby the current following a short-circuit in a vapor or other current rectifier will be limited to a comparatively small value, the evil effects of short-circuits being thereby substantially eliminated and the occurrence of the short circuits themselves being substantially prevented.

My invention is illustrated in a single figure of the accompanying drawing, in which a vapor-current rectifier 1, that is provided with anode leads 2 and 3 and with a cathode lead 4, is supplied with alternating current through an auto transformer 5 from any suitable supply circuit 6—7. The currents that are delivered to and from the rectifier traverse two inductive devices 8 and 9, each of which is provided with two windings 10—11 and 12—13, respectively, the windings 10 and 13 being included in the connections between the auto transformer 5 and the anode leads 2 and 3, respectively. The windings 11 and 12 are connected in series relation in the cathode lead 4, through which current is supplied to a battery 14 or any other suitable receiver of direct current, the other terminal of the battery or receiver being connected to a suitable intermediate point 15 of the winding of the auto transformer 3. The winding 11 is arranged, under normal conditions, to produce a flux in the inductive device 8 in opposition to that produced by the winding 10; likewise, the winding 12 opposes the winding 13 under normal conditions.

In the operation of the system, alternate half waves of the alternating current traverse the coil 10, the anode lead 2, the rectifier 1, cathode lead 4, windings 12 and 11, and the battery 10, while the other alternate half waves traverse the winding 13, the anode lead 3, the rectifier 1, cathode lead 4, the windings 12 and 11, and the battery 10, the currents that traverse the cathode lead 4, the windings 12 and 11, and the battery being always in the same direction. The currents traversing the windings of the inductive devices produce fluxes in the directions indicated by arrows 16, 17, 18 and 19, respectively, from which it will be seen that the two windings of each device oppose each other during alternate half waves of the current, so that little or no inductances are opposed to the flow of the half waves of alternating current in the anode leads 2 and 3. The fluxes produced respectively by the coils 11 and 12 are alternately unopposed, and, consequently, the said coils alternately serve as sustaining devices for the rectified current. If, for any reason, a temporary short circuit occurs within the rectifier between the anodes, the windings 10 and 13 will both be included in the said circuit, thus limiting the short circuit current to a low and unobjectionable value. Moreover, the resistance to the flow of short circuit current is such as to substantially prevent the occurrence of the short-circuits themselves.

While the invention has been shown and described as employed in connection with a vapor rectifier, it will be understood that it is not limited in its application to such specific use, but may be employed wherever found useful without departing from the spirit of the invention.

I claim as my invention:

1. The combination with a vapor electric device having two anode leads and a cathode lead, of two inductive devices each having two windings, one winding of each device being connected in the cathode lead and the remaining windings being connected respectively in the anode leads.

2. The combination with a vapor electric device having two anode leads and a cathode lead, of two inductive devices each having two windings, one winding of each device being connected in the cathode lead and the remaining windings being connected respectively in the anode leads, and the windings of each device being arranged to normally oppose each other.

3. The combination with a current-rectifying device having two anode leads and a cathode lead, of two inductive devices each having two windings, one winding of each device being connected in the cathode lead and the remaining windings being connected respectively in the anode leads.

4. The combination with a current-rectifying device having two anode leads and a cathode lead, of two inductive devices each having two windings, one winding of each device being connected in the cathode lead and the remaining windings being connected respectively in the anode leads, and the windings of each device being arranged to normally oppose each other.

In testimony whereof, I have hereunto subscribed my name this 31st day of Oct. 1911.

QUINCY A. BRACKETT.

Witnesses:
RAY P. JACKSON,
B. B. HINES.